United States Patent [19]

Kastan

[11] Patent Number: 5,163,697
[45] Date of Patent: Nov. 17, 1992

[54] BICYCLE SHOCK ABSORBING AND ENERGY DAMPING APPARATUS

[76] Inventor: B. Linn Kastan, 6432 El Camino Del Teatro, La Jolla, Calif. 92037

[21] Appl. No.: 688,866

[22] Filed: Apr. 22, 1991

[51] Int. Cl.⁵ ............................................. B62K 21/20
[52] U.S. Cl. ..................................... 280/276; 280/280
[58] Field of Search ........................ 280/276, 279, 280

[56] References Cited

U.S. PATENT DOCUMENTS

| | | | |
|---|---|---|---|
| 2,233,313 | 2/1941 | Hazelroth | 280/276 |
| 2,687,898 | 8/1954 | Schwinn | 280/276 |
| 4,012,055 | 3/1977 | Ottow | 280/276 |
| 4,057,264 | 11/1977 | Suzuki et al. | 280/276 |
| 4,553,769 | 11/1985 | Kawaguchi | 280/276 |

FOREIGN PATENT DOCUMENTS

| | | | |
|---|---|---|---|
| 0420610 | 4/1991 | European Pat. Off. | 280/279 |
| 1575132 | 5/1970 | Fed. Rep. of Germany | 280/276 |
| 1029437 | 6/1953 | France | 280/276 |
| 0212687 | 8/1989 | Japan | 280/276 |

*Primary Examiner*—H. Grant Skaggs
*Assistant Examiner*—Carol Lynn Druzbick
*Attorney, Agent, or Firm*—Jack C. Munro

[57] ABSTRACT

The including between the handlebars and the front wheel of a bicycle of a shock absorbing and energy damping apparatus to absorb shock that is incurred by the bicycle as the bicycle moves over uneven terrain. The shock absorbing and energy damping apparatus includes a piston which is axially movable within a fluid chamber. There is also included a spring arrangement within this chamber which also acts against the piston.

8 Claims, 2 Drawing Sheets

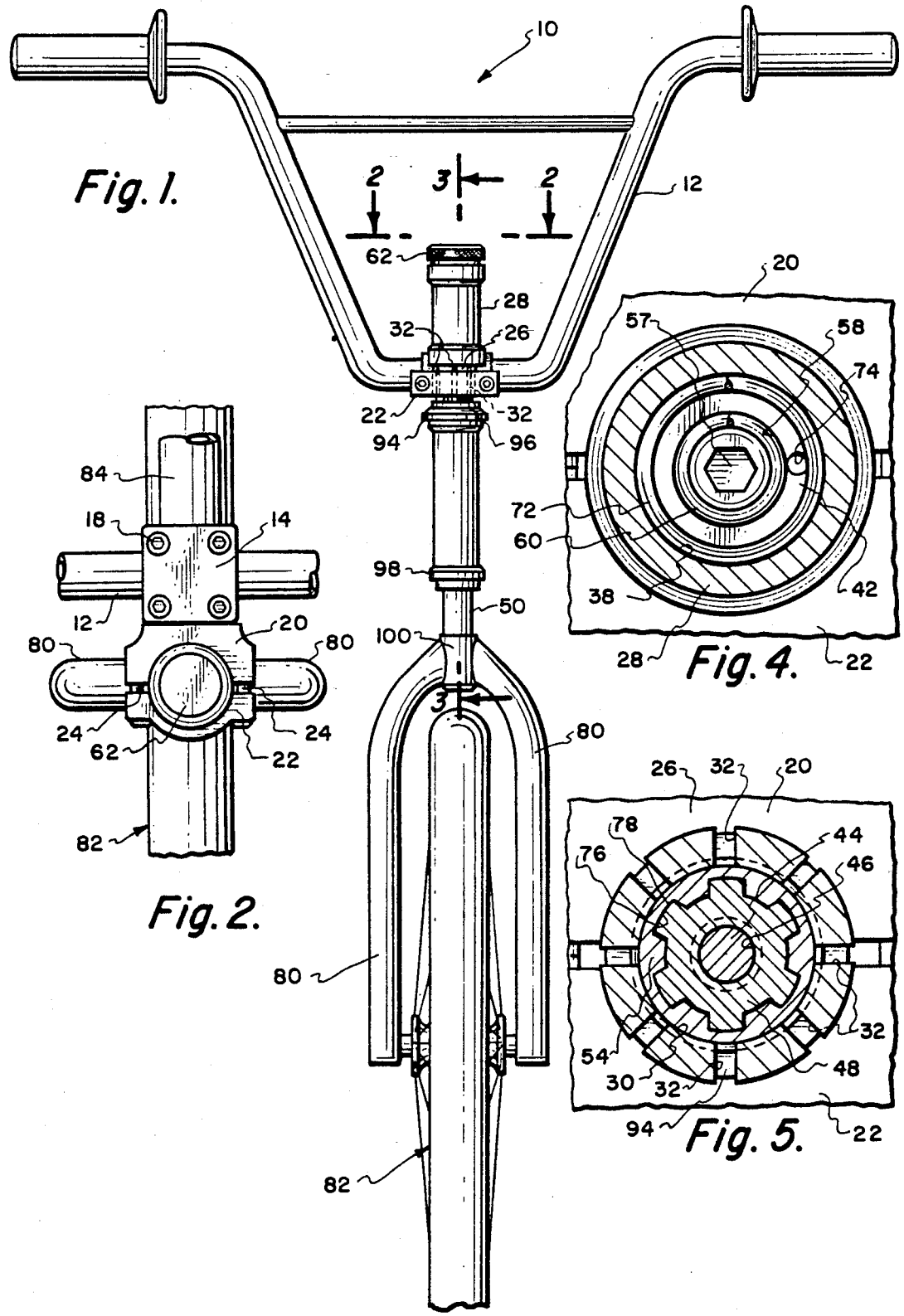

BICYCLE SHOCK ABSORBING AND ENERGY DAMPING APPARATUS

BACKGROUND OF THE INVENTION

1. Field of the Invention

The subject matter of this invention pertains to bicycles and more particularly to the incorporating of a shock absorbing apparatus in association with the front fork which provides an interconnection between the handlebar assembly and the front wheel of the bicycle.

2. Description of Related Art

Bicycles have been in long usage by human beings. In many countries, bicycles are the primary mode of transportation.

It is common to construct bicycles to have a front wheel and a rear wheel with there being a solid rigid connection between both wheels and the frame of the bicycle with no shock absorbing arrangement incorporated therebetween. During the time that bicycles are operated on perfectly paved roads, there is little need for any king of shock absorbing arrangement. However, when a bicycle incurs a chuckhole or curb, a shock absorbing arrangement would definitely be desirable because that shock is transferred directly through the wheels of the bicycle to the operator.

Also, it is exceedingly common that bicycles are operated on unpaved roads. A very common type of bicycle that has now accepted widespread usage is what is referred to as a "mountain bike". The mountain bike is designed for "off road" travel. It is readily apparent that any bike that is traversing in unpaved terrain is constantly receiving shocks that are transmitted to the operator. This transmission of shock is capable of causing injury though in most instances such continuous transmission of shocks cause the operator to become prematurely exhausted.

Also, some bicycles are used in racing. When racing a bicycle, the incorporation of a shock absorbing assembly in conjunction with the bicycle greatly diminishes the stress and strain to which the operator is subjected. This means that the racer that utilizes the shock absorbing arrangement in conjunction with a bicycle has a definite competitive advantage over a racer that does not use such a device.

Previously, there have been attempts at designing a shock absorbing arrangement in conjunction with a bicycle. However, these devices have been quite complex in construction and require extensive modification of the front wheel supporting structure of a bicycle. Also, these devices have been quite expensive and because of this expense, widespread usage has not resulted. Still further, it has not been known to construct a shock absorbing and energy damping apparatus that is designed to merely replace existing parts on a bicycle eliminating the need for custom modification of the bicycle.

SUMMARY OF THE INVENTION

The primary objective of the present invention is to construct a shock absorbing and energy damping apparatus to be used in conjunction with a front wheel of a bicycle which greatly diminishes the force that is transmitted to the operator's hands and arms of the bicycle during usage of the bicycle.

Another objective of the present invention is to construct a shock absorbing and energy damping apparatus that can be retrofitted onto an existing bicycle eliminating the need for special bicycle construction.

Conventional bicycles include a front wheel which is mounted on a fork with the apex member of the fork being defined as a steerer tube. This steerer tube is conducted through a sleeve of the frame which is defined as a head tube. This steerer tube is low-frictionally supported by a bearing assembly within the head tube. A portion of the steerer tube that appears above the had tube is attached to the handlebar assembly which is to be utilized by the operator to effect steering of the bicycle. The structure of the present invention incorporates a housing sleeve between the head tube and the steerer tube with this housing sleeve being rotatable relative to the head tube but is axially fixed in position relative to the head tube. The steerer tube is mounted within the housing sleeve in a manner to permit axial movement but is pivotally fixed relative to the housing sleeve. The upper end of the steerer tube has mounted thereon a piston with this piston being movably mounted within a chamber formed within a cylinder. This cylinder is fixedly secured to the housing sleeve. Within the chamber of the cylinder is located a shock absorbing and energy damping apparatus with a typical such apparatus including a spring assembly and a fluid damper. The piston includes an orifice. When a shock is incurred by the front wheel of the bicycle, the steerer tube is caused to move in an upward direction with the piston moving within the chamber. The natural at-rest position for the piston is at the bottom end of the chamber. As the piston moves with the chamber, fluid is moved through the orifice of the piston with the spring assembly being compressed. When the energy that is stored within the spring forces the front wheel and the steerer tube in a downward direction after the front wheel of the bicycle has moved passed the structure that has produced the shock, this downward movement of the piston is damped by fluid being conducted through the orifice of the piston.

BRIEF DESCRIPTION OF THE DRAWINGS

FIG. 1 is a front view of a bicycle which includes the shock absorbing and energy damping apparatus of the present invention;

FIG. 2 is top plan view of the structure of this invention taken along line 2—2 of FIG. 1;

FIG. 4 is a transverse cross-sectional view through the cylinder utilized in conjunction with the shock absorbing and energy damping apparatus of the present invention taken along line 4—4 of FIG. 3;

FIG. 5 is a cross-sectional view through the upper end of the steerer tube and the cylinder of the structure of the present invention taken along line 5—5 of FIG. 3 showing the steerer tube in a non-shock receiving position.

DETAILED DESCRIPTION OF THE SHOWN EMBODIMENT

Figures 3, 6:
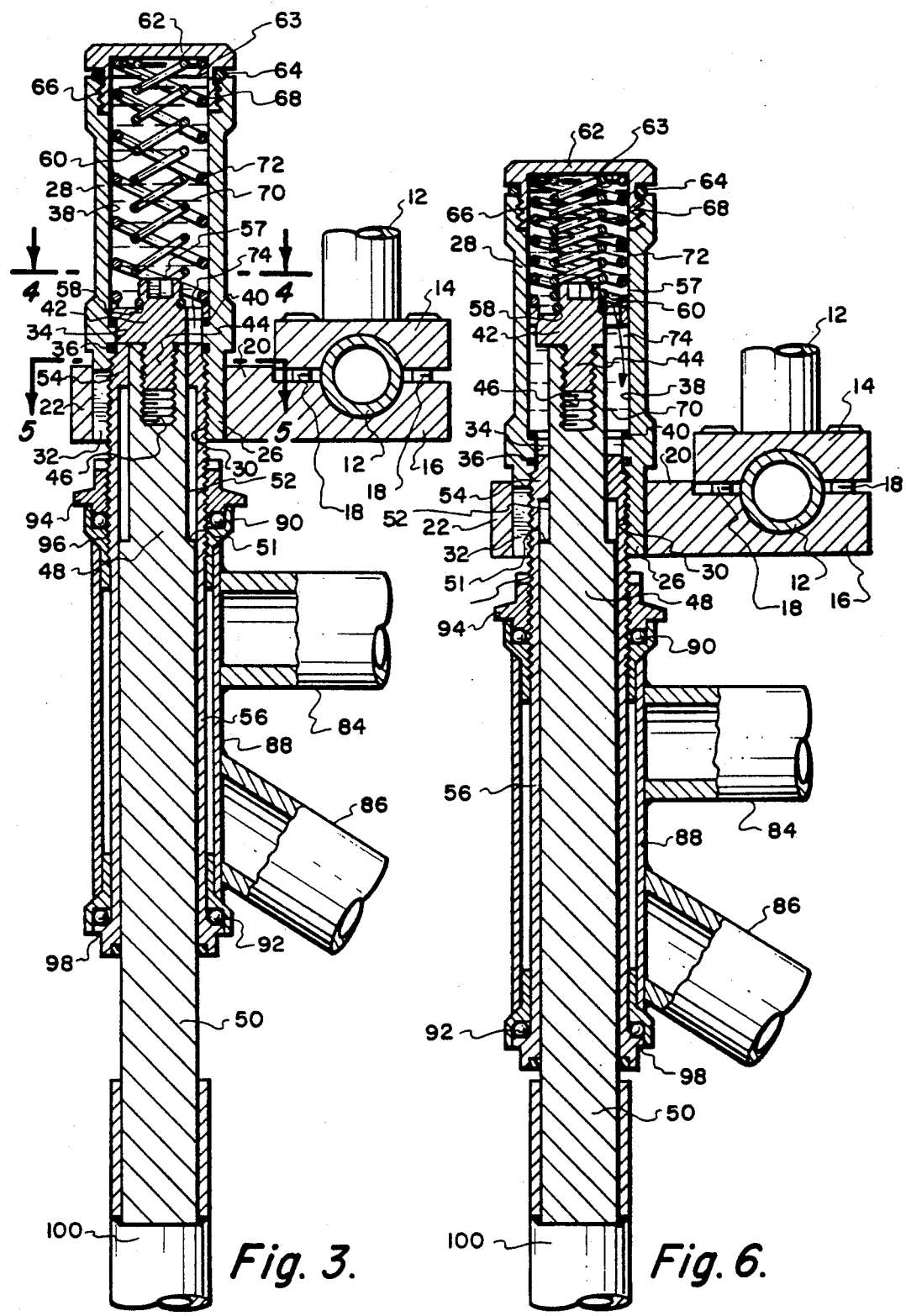
FIG. 3 is a longitudinal cross-sectional view through the front fork of the bicycle within which has bene incorporated the shock absorbing and energy damping apparatus of the present invention.
FIG. 6 is a view similar to FIG. 3 but showing the steerer tube in its most upward position which would be when the front wheel incurs a significant amount of shock force.

Referring particularly to the drawings, there is shown in FIG. 1 a conventional bicycle 10 which has a handlebar assembly 12 which is mounted between a pair of clamping plates 14 and 16. Conventional fasteners 18 interconnect plates 14 and 16. Plate 16 includes an integral extension 20 which is clampingly, fixedly secured to a clamping plate 22 by means of fasteners 24. Clamping plate 22 and extension 20 are mounted against cylindrical mounting sleeve 26 of a cylinder 28. The mounting sleeve 26 has an internal through hole 30 which is internally threaded. Formed through the wall of the sleeve 26 are a plurality (eight in number) of evenly spaced apart slits 32.

Directly adjacent the through hole 30 is an annular chamber 34. Between the chamber 34 and through hole 30 is an O-ring seal 36. The upper end of the annular chamber 34 is connected to an enlarged interior chamber 38. Formed between the interior chamber 38 and the annular chamber 34 is a ledge on which is located a resilient washer 40. The washer 40 is to function as a shock absorbing device for a piston 42. The piston 42 includes a threaded end 44 which is threadably secured within a threaded hole 46 formed within the upper end 48 of a steerer tube 50. This upper end 48 is of a cylindrical lesser diameter than the remaining portion 50 of steerer tube. This lesser diameter of upper end 48 defines a movement limiting annular chamber 52. The length of the chamber 52 will determine the total length of movement of the steerer tube composed of upper end 48 and remaining portion 50 is an annular ledge 51. Ledge 51 is capable of coming into contact with end 54 of a housing sleeve 56.

Normally abutting against the outer surface of end 54 is the piston 42. The upper end of the piston 42 includes a polygonal shaped head 57. Surrounding the head 57 is an annular recess 58. Located within the recess 58 is an internal compression spring 60. The outer end of the spring 60 abuts against the inside surface of a cap 62. The cap 62 has a resilient seal 64 located between the cap 62 and the cylinder 28. Cap 62 includes an externally threaded section 66 which threadably engages with internally threaded section 68 formed within the uppermost end of the cylinder 28. Installing and removal of the cap 62 is accomplished manually and when the cap 62 is so installed the interior chamber 38 is closed. Within this interior chamber 38 is to be located a quantity of fluid 70 which may comprise an oil, water or even a gas. Surrounding the spring 60 is an external spring 72. Spring 72 is also a compression spring but has a different compressive rate than that of spring 60. Normally spring 60 will be easier to compress than the spring 72. The upper end of the spring 72 abuts against the inside surface of the cap 62 with the lower end of spring 72 abutting against the piston 42. Spring 60 is to react to shocks of less force with spring 72 to react to shocks of greater force.

The piston 42 includes an orifice 74. As the piston 42 moves within the chamber 38, both the springs 60 and 72 are to be compressed simultaneously. The fluid 70 is to be squeezed through orifice 74. It is the fluid 70 that functions to dampen the movement of the piston 42.

When the clamping plate 22 is being tightened and caused to move toward extension 20 about the member 26, the width of the slits 32 is diminished and the cylinder 28 is tightly secured onto the upper end 54 of the housing sleeve 56. Steering movement of the handlebar assembly 12 is transferred through the cylinder 28 to the upper end 54 of the housing sleeve 56. The upper end 54 includes a plurality of internal splines 76. Engaging with the splines 76 are a plurality of external splines 78 which are mounted on the exterior surface of the upper end 48 of the steerer tube 50. This splined arrangement permits the upper end 48 to axially move relative to the upper end 54 of the steerer tube 50. However, pivoting movement of the handlebar assembly 12 is transferred directly form the cylinder 28 to the steerer tube 50 and hence to the fork members 80 upon which is mounted the front wheel 82 of the bicycle 10.

The housing sleeve 56 is axially fixed in position relative to the bicycle frame which is composed of frame tubes 84 and 86 which are welded onto a head tube 88. However, the housing sleeve 56 is capable of pivoting or rotational movement relative to head tube 88. This rotational movement is permitted by means of bearing assemblies 90 and 92 which connect between the housing sleeve 56 and the head tube 88. The bearing assembly 90 includes a bearing cap 94 which is threadably secured onto externally threaded section 96 of the housing sleeve 56. The bearing assembly 92 is mounted onto an annular flange 98 which is formed integral with the housing sleeve 56. The lower end of the steerer tube 50 is secured as by welding through a fork collar 100 which then joins to the fork members 80.

As previously mentioned, the steering motion of the handlebar assembly 12 which is received from the operator is pivotally, directly transferred through the section 26 of the cylinder 28 to the upper end 54 of the housing sleeve 56. From the housing sleeve 56, there is direct transfer of the pivoting motion to the upper end 48 of the steerer tube 50 an hence through the fork collar 100 to the fork members 80 and to the front wheel 82.

Upon the front wheel 82 incurring an upward jolting force such as when the front wheel 82 would contact a rock, a curb, or some other similar type of upwardly protruding protuberance located on the terrain on which the bicycle 10 is traveling, the steerer tube 50 will be moved in an upward direction. This movement will be permitted due to the splines 76 and 78 between the housing sleeve 56 and the steerer tube 50, respectively. This causes the piston 42 to be moved upward within the chamber 48 as is clearly shown in comparing FIG. 6 with FIG. 3. This causes the springs 60 and 72 to be compressed therefore storing the energy of the shock which is produced when the front wheel 82 comes into contact and rides over the protuberance. The affect of this shock is minimally transferred to the handlebar assembly 12 and therefore minimally affects the operator.

Once the bicycle front wheel 82 has stored the shock of the protuberance, the stored energy within the springs 60 and 72 tends to move the piston 42 as well as the steerer tube 50 to a lower position as is shown in FIG. 3 of the drawings. During this movement, fluid 70 is conducted through the orifice 74 which, by the way, also occurred when the piston 42 moved in the upward direction. Although there is a certain amount of dissipation of energy due to the forcing of the fluid 70 through the orifice 74, it is the primary purpose of the fluid 70 to function as a damping mechanism when the steerer tube 50 is moved upward, upon incurring of a shock by the front wheel 82, and then returns immediately to the lower position after the front wheel 82 has compensated for the effect of the shock.

What is claimed is:

1. In combination with a bicycle, said bicycle having a frame, a front wheel mounted on said frame, a handlebar adapted to be grasped by the operator, a fork, said front wheel mounted on said fork, said fork being attached to a steerer tube, said frame including a head tube, said steerer tube being pivotally mounted within said head tube about a longitudinal center axis, a cylinder axially fixed relative to said head tube but capable of rotation relative to said head tube also about said longitudinal center axis, said handlebar being fixedly mounted on said cylinder, the improvement comprising:

said cylinder having an interior chamber, a piston mounted on said steerer tube, said steerer tube being axially movable relative to said cylinder which results in said piston being movable within said interior chamber, shock absorbing and energy damping means located within said interior chamber, said shock absorbing and energy damping means acting against said piston.

2. The combination as defined in claim 1 wherein:
said shock absorbing and energy damping means including a spring assembly.

3. The combination as defined in claim 2 wherein:
said shock absorbing and energy damping means including a fluid medium.

4. The combination as defined in claim 1 wherein:
a housing sleeve, said steerer tube being mounted within said housing sleeve in a close conforming manner, said housing sleeve being located between said steerer tube and said head tube, there being a splined connection between said steerer tube and said housing sleeve causing said housing sleeve to pivot along with said steerer tube yet permitting axial movement of said steerer tube relative to said housing sleeve.

5. The combination as defined in claim 4 wherein:
said cylinder being fixedly mounted on said housing sleeve.

6. The combination as defined in claim 5 wherein:
said housing sleeve being mounted by a bearing assembly on said head tube, said bearing assembly permitting pivoting movement between said head tube and said housing sleeve.

7. The combination as defined in claim 1 wherein:
said piston having an orifice, said interior chamber containing a fluid medium, said fluid medium to be conducted through said orifice during movement of said steerer tube within said interior chamber.

8. The combination as defined in claim 7 wherein:
said shock absorbing and energy damping means including a spring assembly.

* * * * *